US012045144B2

(12) United States Patent
Mathew et al.

(10) Patent No.: US 12,045,144 B2
(45) Date of Patent: Jul. 23, 2024

(54) ORCHESTRATOR FOR ORCHESTRATING OPERATIONS BETWEEN A COMPUTING ENVIRONMENT HOSTING VIRTUAL MACHINES AND A STORAGE ENVIRONMENT

(71) Applicant: NetApp Inc., San Jose, CA (US)

(72) Inventors: Jose Mathew, Santa Clara, CA (US); Ling Zheng, Saratoga, CA (US)

(73) Assignee: NetApp, Inc., San Jose, CA (US)

(*) Notice: Subject to any disclaimer, the term of this patent is extended or adjusted under 35 U.S.C. 154(b) by 0 days.

(21) Appl. No.: 18/317,298

(22) Filed: May 15, 2023

(65) Prior Publication Data

US 2023/0281088 A1    Sep. 7, 2023

Related U.S. Application Data

(63) Continuation of application No. 16/856,249, filed on Apr. 23, 2020, now Pat. No. 11,650,886.
(Continued)

(51) Int. Cl.
*G06F 11/14* (2006.01)
*G06F 3/06* (2006.01)
*G06F 9/455* (2018.01)

(52) U.S. Cl.
CPC ........ *G06F 11/1469* (2013.01); *G06F 3/0619* (2013.01); *G06F 3/065* (2013.01); *G06F 3/0664* (2013.01); *G06F 3/0673* (2013.01); *G06F 9/45558* (2013.01); *G06F 11/1451* (2013.01); *G06F 11/1458* (2013.01);
(Continued)

(58) Field of Classification Search
CPC .. G06F 11/14; G06F 11/1458; G06F 11/1464; G06F 11/1484; G06F 3/065
See application file for complete search history.

(56) References Cited

U.S. PATENT DOCUMENTS 5,515,499 A   5/1996   Allen et al.
5,907,672 A   5/1999   Matze et al.
(Continued)

FOREIGN PATENT DOCUMENTS

CN    105094948 A     11/2015
WO    2016099116 A1   6/2016

OTHER PUBLICATIONS

Notice of Allowance mailed on Apr. 14, 2023 for U.S. Appl. No. 16/856,249, filed Apr. 23, 2020, 2 pages.
(Continued)

*Primary Examiner* — Kamini B Patel
(74) *Attorney, Agent, or Firm* — Cooper Legal Group, LLC

(57) ABSTRACT

Techniques are provided for orchestrating operations between a storage environment and a computing environment hosting virtual machines. A virtual machine proxy, associated with a computing environment hosting a virtual machine, is accessed by an orchestrator to identify the virtual machine and properties of the virtual machine. A storage proxy, associated with a storage environment comprising a volume within which snapshots of the virtual machine are to be stored, is accessed by the orchestrator to initialize a backup procedure. The orchestrator utilizes the virtual machine proxy to create a snapshot of the virtual machine. The orchestrator utilizes the storage proxy to back up the snapshot to the volume using the backup procedure.

20 Claims, 8 Drawing Sheets

Related U.S. Application Data

(60) Provisional application No. 62/867,504, filed on Jun. 27, 2019.

(52) U.S. Cl.
CPC ...... *G06F 11/1464* (2013.01); *G06F 11/1484* (2013.01); *G06F 2009/45562* (2013.01); *G06F 2009/45575* (2013.01); *G06F 2201/80* (2013.01); *G06F 2201/815* (2013.01); *G06F 2201/84* (2013.01)

(56) References Cited

U.S. PATENT DOCUMENTS

| | | | |
|---|---|---|---|
| 8,060,474 | B2 | 11/2011 | Beatty et al. |
| 8,255,650 | B1 | 8/2012 | Gruttadauria et al. |
| 8,566,542 | B1 | 10/2013 | Wang et al. |
| 8,719,286 | B1 | 5/2014 | Xing et al. |
| 8,983,961 | B2 | 3/2015 | Chan et al. |
| 9,292,327 | B1 | 3/2016 | Von et al. |
| 9,483,485 | B1 | 11/2016 | Chockalingam et al. |
| 9,665,437 | B2 | 5/2017 | Bhargava et al. |
| 9,740,520 | B1 | 8/2017 | Sarda et al. |
| 9,740,577 | B1 | 8/2017 | Chakraborty et al. |
| 9,898,371 | B2 | 2/2018 | Kumarasamy et al. |
| 9,940,203 | B1 | 4/2018 | Ghatnekar et al. |
| 10,146,634 | B1 | 12/2018 | Bishop et al. |
| 10,152,387 | B1 | 12/2018 | Chakraborty et al. |
| 10,169,067 | B2 | 1/2019 | Dornemann |
| 10,210,048 | B2 | 2/2019 | Sancheti |
| 10,754,741 | B1 | 8/2020 | Sethuramalingam et al. |
| 10,810,035 | B2 | 10/2020 | Guturi et al. |
| 10,824,455 | B2 | 11/2020 | Arikatla et al. |
| 11,023,329 | B1 | 6/2021 | Per et al. |
| 11,025,717 | B2 | 6/2021 | Liu et al. |
| 11,099,956 | B1 | 8/2021 | Polimera et al. |
| 11,188,422 | B2 | 11/2021 | Cisler et al. |
| 11,323,259 | B2 | 5/2022 | Maximov et al. |
| 11,567,792 | B2 | 1/2023 | Guturi et al. |
| 11,615,001 | B2 * | 3/2023 | Naidu ................. G06F 11/1484 711/162 |
| 11,650,886 | B2 * | 5/2023 | Mathew ............. G06F 11/1451 707/649 |
| 11,853,104 | B2 * | 12/2023 | Naidu ................. G06F 11/1451 |
| 11,868,213 | B2 * | 1/2024 | Zheng ................ G06F 11/1458 |
| 2010/0077160 | A1 | 3/2010 | Liu et al. |
| 2012/0089814 | A1 | 4/2012 | Gupta et al. |
| 2012/0117311 | A1 | 5/2012 | Hong |
| 2013/0061293 | A1 | 3/2013 | Mao |
| 2013/0080397 | A1 | 3/2013 | Payne et al. |
| 2013/0159359 | A1 | 6/2013 | Kumar et al. |
| 2013/0166511 | A1 | 6/2013 | Ghatty et al. |
| 2013/0238562 | A1 | 9/2013 | Kumarasamy et al. |
| 2014/0032838 | A1 | 1/2014 | Takeuchi et al. |
| 2014/0074790 | A1 | 3/2014 | Berman et al. |
| 2014/0195503 | A1 | 7/2014 | Kao et al. |
| 2014/0196056 | A1 | 7/2014 | Kottomtharayil et al. |
| 2014/0244818 | A1 | 8/2014 | Taine et al. |
| 2015/0127618 | A1 | 5/2015 | Alberti et al. |
| 2017/0116219 | A1 | 4/2017 | Shetty |
| 2017/0171311 | A1 | 6/2017 | Tennie et al. |
| 2017/0171340 | A1 | 6/2017 | Kurita |
| 2018/0113622 | A1 | 4/2018 | Sancheti |
| 2018/0129567 | A1 | 5/2018 | Kumarasamy |
| 2018/0157538 | A1 | 6/2018 | Raikov et al. |
| 2019/0104196 | A1 | 4/2019 | Li et al. |
| 2019/0235971 | A1 | 8/2019 | Botelho et al. |
| 2020/0042344 | A1 | 2/2020 | Ao et al. |
| 2020/0125386 | A1 * | 4/2020 | Busick .................. H04L 47/746 |
| 2020/0133502 | A1 | 4/2020 | Yang et al. |
| 2020/0183731 | A1 | 6/2020 | Dornemann |
| 2020/0409738 | A1 * | 12/2020 | Naidu ..................... G06F 3/065 |
| 2020/0409797 | A1 | 12/2020 | Mathew et al. |
| 2020/0409803 | A1 * | 12/2020 | Naidu .................. G06F 3/0608 |
| 2021/0406129 | A1 * | 12/2021 | Zheng ................ G06F 11/1458 |
| 2022/0318188 | A1 * | 10/2022 | Subramanian ........ G06F 16/128 |
| 2022/0350642 | A1 * | 11/2022 | Poddar .................... G06F 21/53 |
| 2023/0012869 | A1 * | 1/2023 | Suarez ...................... G06F 8/71 |
| 2023/0087493 | A1 * | 3/2023 | Busick ............... H04L 67/1097 718/1 |
| 2023/0088202 | A1 * | 3/2023 | Myers ....................... G06F 8/63 717/176 |
| 2023/0115438 | A1 * | 4/2023 | DeGraaf ............... G06F 9/5072 707/652 |
| 2023/0221980 | A1 | 7/2023 | Guturi et al. |
| 2023/0222041 | A1 | 7/2023 | Muniraju et al. |
| 2023/0229568 | A1 * | 7/2023 | Naidu .................. G06F 3/0664 711/162 |
| 2023/0244466 | A1 * | 8/2023 | Shah ....................... H04L 67/34 717/178 |
| 2023/0281088 | A1 * | 9/2023 | Mathew ............. G06F 11/1453 707/649 |
| 2023/0401088 | A1 * | 12/2023 | Poddar ................ G06F 11/1433 |
| 2023/0409381 | A1 * | 12/2023 | Poddar .................... H04L 63/20 |

OTHER PUBLICATIONS

1 Notice of Allowance mailed on Dec. 22, 2023 for U.S. Appl. No. 18/190,172, filed Mar. 27, 2023, 8 pages.

Notice of Allowance mailed on Sep. 25, 2023 for U.S. Appl. No. 16/856,367, filed Apr. 23, 2020, 02 pages.

Non-Final Office Action cited in U.S. Appl. No. 16/856,367 mailed Sep. 6, 2022, 25 pages.

Final Office Action cited in U.S. Appl. No. 16/856,367 mailed Mar. 24, 2023, 31 pages.

Notice of Allowance cited in U.S. Appl. No. 16/856,367 mailed Jul. 3, 2023, 32 pages.

Non-Final Office Action cited in U.S. Appl. No. 16/856,322, mailed Aug. 2, 2022, 21 pages.

Notice of Allowance cited in U.S. Appl. No. 16/856,322, mailed Dec. 1, 2022, 18 pages.

Non-Final Office Action cited in U.S. Appl. No. 16/856,249, mailed Jul. 21, 2022, 25 pages.

Notice of Allowance cited in U.S. Appl. No. 16/856,249, mailed Jan. 11, 2023, 26 pages.

Non-Final Office Action mailed on Aug. 31, 2023 for U.S. Appl. No. 18/190,172, filed Mar. 27, 2023, 12 pages.

Notice of Allowance mailed on Aug. 9, 2023 for U.S. Appl. No. 16/856,367, filed Apr. 23, 2020, 08 pages.

International Search Report and Written Opinion for Application No. PCT/US2020/039038, mailed on Sep. 25, 2020, 10 pages.

Notice of Allowance mailed on Apr. 2, 2024 for U.S. Appl. No. 18/190,172, filed Mar. 27, 2023, 02 pages.

\* cited by examiner

ORCHESTRATOR FOR ORCHESTRATING OPERATIONS BETWEEN A COMPUTING ENVIRONMENT HOSTING VIRTUAL MACHINES AND A STORAGE ENVIRONMENT

RELATED APPLICATION

This application claims priority to and is a continuation U.S. patent application Ser. No. 16/856,249, titled "ORCHESTRATOR FOR ORCHESTRATING OPERATIONS BETWEEN A COMPUTING ENVIRONMENT HOSTING VIRTUAL MACHINES AND A STORAGE ENVIRONMENT" and filed on Apr. 23, 2020, which claims priority to and the benefit of U.S. Provisional Application No. 62/867,504, titled "BACKUP AND RESTORE BETWEEN A COMPUTING ENVIRONMENT AND A STORAGE ENVIRONMENT" and filed on Jun. 27, 2019, which are incorporated herein by reference.

BACKGROUND

A computing environment may be configured to host virtual machines that are made accessible to client devices. The computing environment may comprise a virtual machine management platform, a hypervisor (e.g., an Elastic Sky X (ESX) server), and/or other hardware and software used to host and manage the virtual machines. The hypervisor utilizes software to abstract processor, memory, storage, and networking resources for use by one or more virtual machines. Each virtual machine runs its own operating system (a guest operating system) and applications. The hypervisor creates logical pools of system resources from the same physical resources. The logical pools of system resources are each assigned to individual virtual machines to enable multiple virtual machines to separately share the same physical resources. A virtual machine may execute a guest operating system that stores user data, application data, and operating system data within virtual disks.

Unfortunately, the computing environment, such as the virtual machine management platform, may not provide adequate data protection and storage functionality required by clients. For example, the computing environment may not provide adequate levels of deduplication, compression, encryption, back and restore functionality, incremental backup and restore functionality, and/or other levels of storage functionality required by the clients. Thus, the virtual machine management platform may not provide adequate data protection and storage efficiency for backing up and restoring data of the virtual machines in a scalable manner.

DETAILED DESCRIPTION

Figure 1:
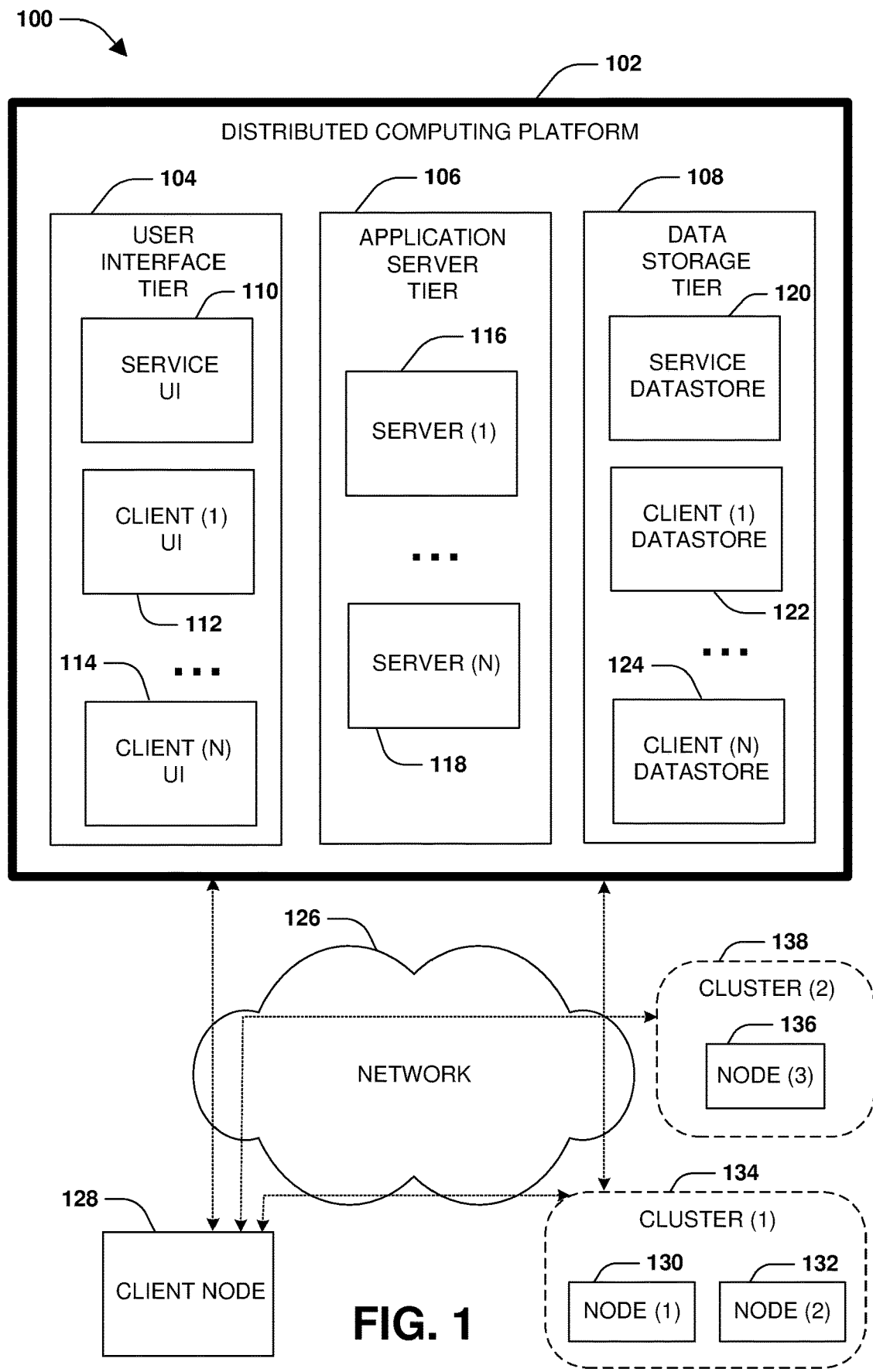
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing environment provides virtualization layer services and virtual machine hosting functionality to host virtual machines that can be accessed by client devices for storing data, executing applications, hosting services, etc. For example, the computing environment may comprise a hypervisor, such as an Elastic Sky X (ESX) server, configured to host virtual machines. The computing environment may comprise a virtual machine management platform that provides a variety of services for managing virtual machines, such as the creation of snapshots of virtual machines.

A virtual machine may execute a guest operating system that can be accessed by a client device. The client device can use the guest operating system to execute the applications, create and store the data within virtual disks used by the virtual machine to store data, etc. The computing environment may provide basic storage and management functionality for the virtual machines, such as by maintaining virtual disks within which virtual machines can store data, along with the ability to generate snapshot backups of the virtual machines by creating snapshots of the virtual disks. However, the computing environment such as the virtual machine management platform may lack adequate data protection and storage functionality for providing a level of data protection required by clients and storage efficiency for backing up and restoring data of the virtual machines in a scalable manner.

In contrast, a storage environment may provide robust data protection and storage functionality, such as long term scalable storage, backup functionality, restore functionality, incremental backup and restore functionality, deduplication, encryption, compression, data migration between various types of storage such as on-premise storage and cloud storage, snapshot creation, snapshot storage, and snapshot management, etc. Unfortunately, the computing environment and the storage environment are unable to natively communicate and coordinate with one another in order to perform various operations, such as backup and restore operations, snapshot creation operations, etc. This is because the storage environment may implement application programming interfaces (APIs), communication protocols, data storage formats, commands and operations, and/or other services and functionality that are not compatible with APIs, communication protocols, data storage formats, commands and operations, and/or other services and functionality implemented by the computing environment. Thus, the robust storage functionality of the storage environment cannot be natively leveraged to provide data protection and storage efficiency for the virtual machines hosted within the computing environment because the computing environment and the storage environment are not natively compatible with one another.

Accordingly, as provided herein, an orchestrator is implemented to coordinate operations between the computing environment and the storage environment. In an embodiment, the orchestrator is implemented as hardware, software, a virtual machine, a service, an application, or combination thereof. The orchestrator may be implemented at the computing environment, at the storage environment, a separate environment different than the computing environment and the storage environment, or across multiple computing environments. In an embodiment, the orchestrator may be implemented within a cloud computing environment. In an embodiment, the orchestrator may be implemented as a virtual machine or as a standalone computing device.

The orchestrator is configured to interact with a first proxy, such as a virtual machine proxy, associated with the computing environment within which virtual machines are hosted. The orchestrator can utilize the virtual machine proxy to discover virtual machines hosted by the computing environment, identify objects, metadata, and virtual disks associated with the virtual machines, invoke the virtual machine management platform to create snapshots of virtual machines and perform other functionality and services provided by the virtual machine management platform, etc. The virtual machine proxy is configured to be compatible with the APIs, communication protocols, data storage formats, commands and operations, and/or other services and functionality implemented by the computing environment, such as services and functionality provided by the hypervisor and the virtual machine management platform of the computing environment. Thus, the virtual machine proxy can reformat, modify (e.g., replace, remove, and/or add certain commands, operations, variables, text, parameters, functions, or other portions of a command), or replace commands (e.g., commands expected from the orchestrator may be mapped to corresponding commands understood by the hypervisor and the virtual machine management platform, and thus a command from the orchestrator may be replaced with a corresponding command mapped to the command) from the orchestrator into commands understood by and compatible with the computing environment.

The orchestrator is configured to interact with a second proxy, such as a storage proxy, associated with the storage environment that is configured to provide robust data protection and storage functionality. The orchestrator can utilize the storage proxy to invoke the storage environment to execute various storage and data protection services and functionality, such as to perform a backup, perform a restore, perform an incremental backup and/or restore, identify volumes, data objects, and other resources of the storage environment, schedule backups, create secondary snapshots, define storage polices, etc. The storage proxy is configured to be compatible with the APIs, communication protocols, data storage formats, commands and operations, and/or other services and functionality implemented by the storage environment, such as services and functionality provided by snapshot management functionality, data migration functionality, and data backup and restore functionality of the storage environment. Thus, the storage proxy can reformat, modify (e.g., replace, remove, and/or add certain commands, operations, variables, text, parameters, functions, or other portions of a command), or replace commands (e.g., commands expected from the orchestrator may be mapped to corresponding commands understood by the services and functionality of the storage environment, and thus a command from the orchestrator may be replaced with a corresponding command mapped to the command) from the orchestrator into commands understood by and compatible with the storage environment.

In this way, the orchestrator can coordinate backup, restore, and other operations between the computing environment and the storage environment using the virtual machine proxy to invoke operations at the computing environment such as the creation of a snapshot of a virtual machine and using the storage proxy to invoke operations at the storage environment such as storing the snapshot within a volume as a backup for subsequent restoration of the virtual machine. Without the orchestrator, the virtual machine proxy, and the storage proxy, incompatibilities between the computing environment and the storage environment (e.g., incompatible operations, commands, data formats, APIs, etc.) would inhibit the ability to coordinate operations amongst the computing environment and the storage environment.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that the file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
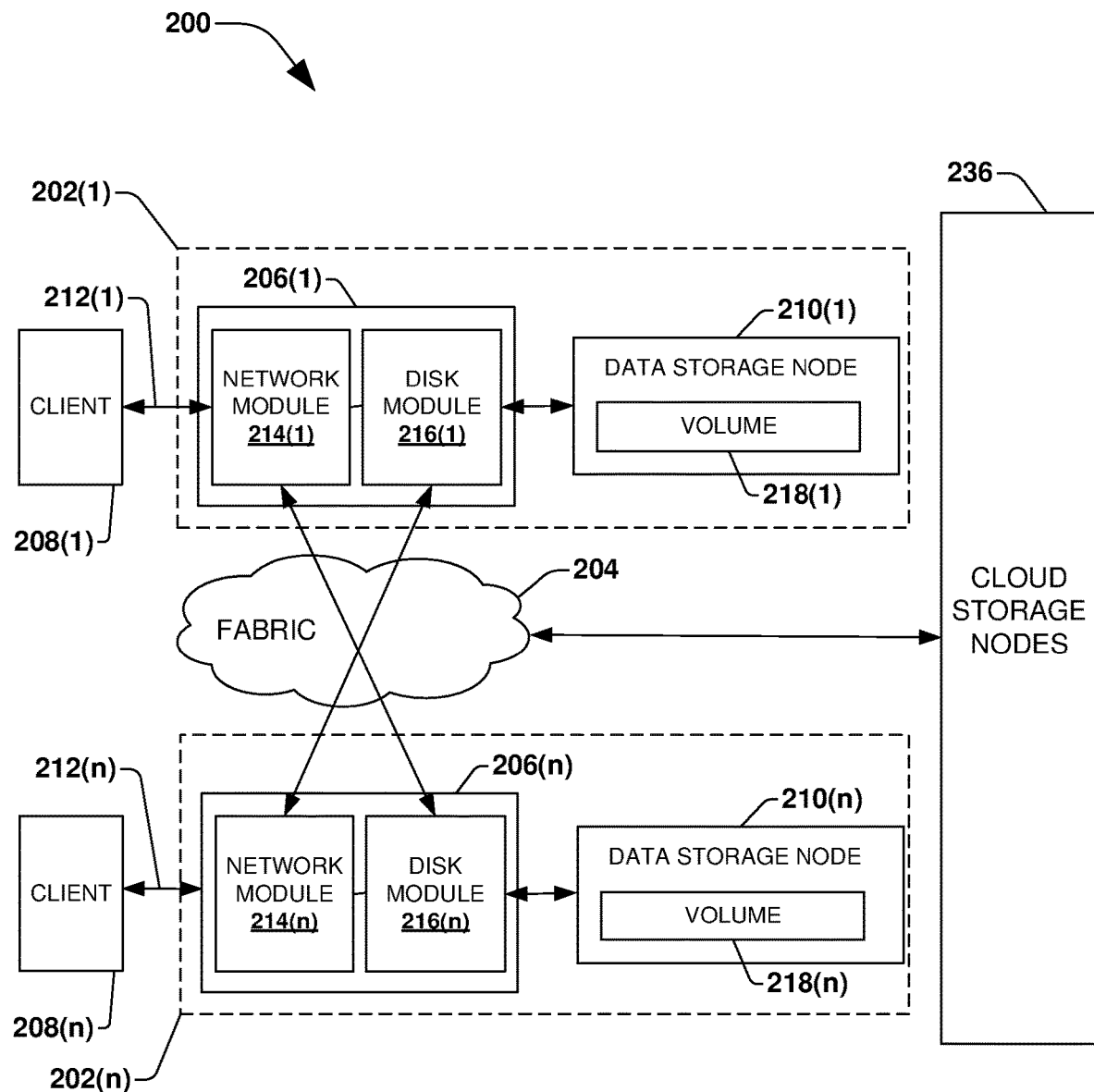
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
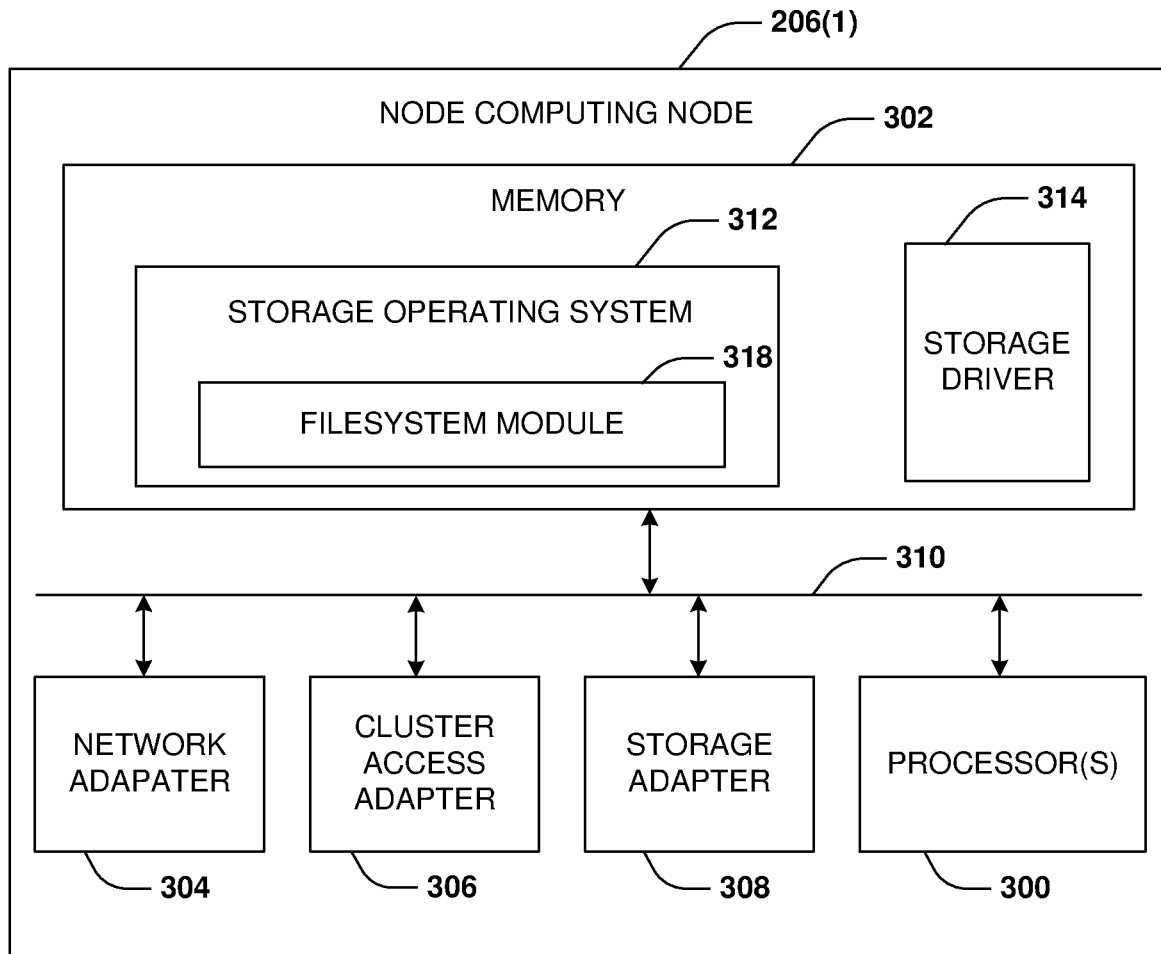
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example orchestrating operations between a computing environment hosting virtual machines and a storage environment as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
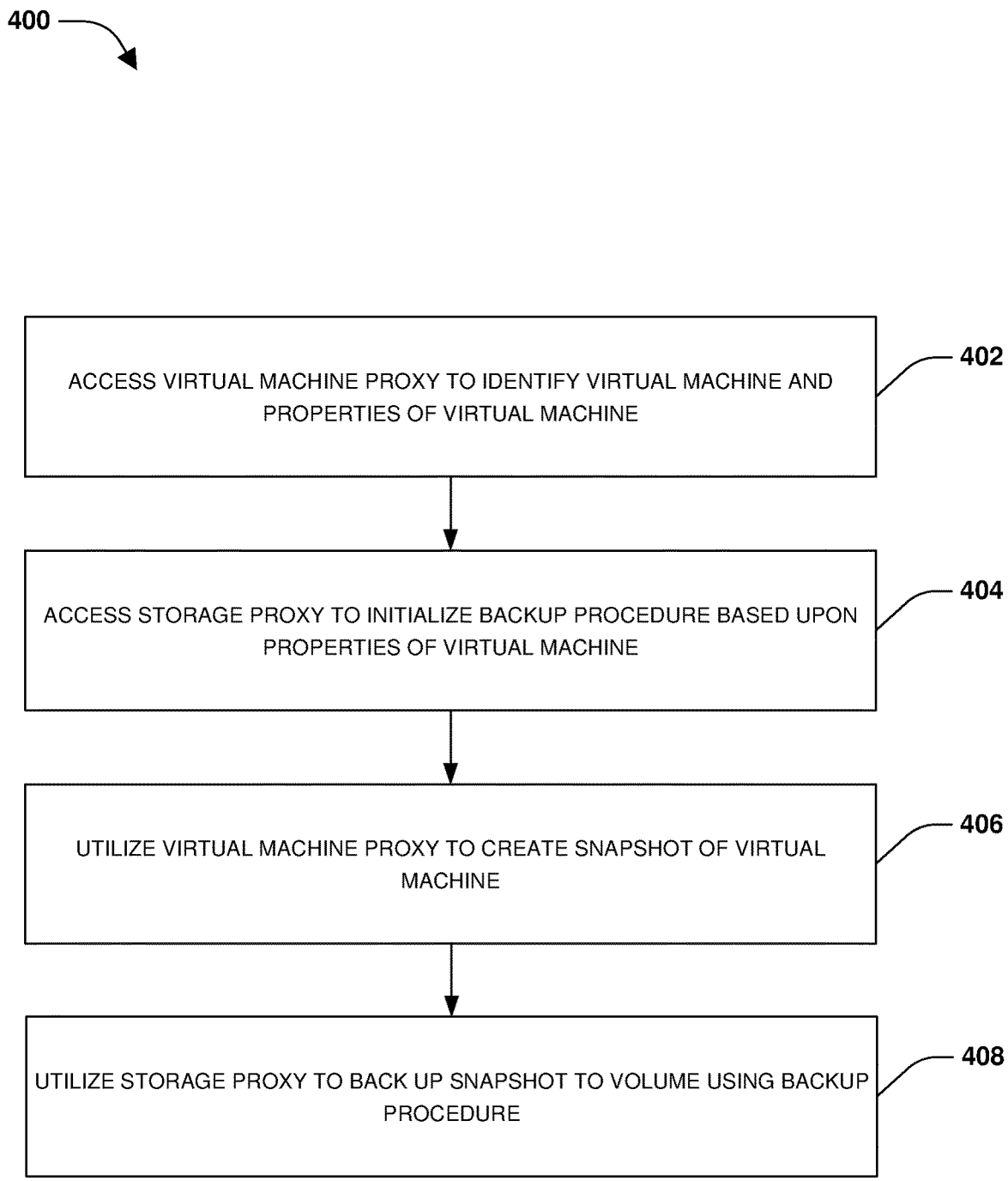
FIG. 4 is a flow chart illustrating an example method for orchestrating operations between a storage environment and a computing environment hosting virtual machines.
Figure 5A:
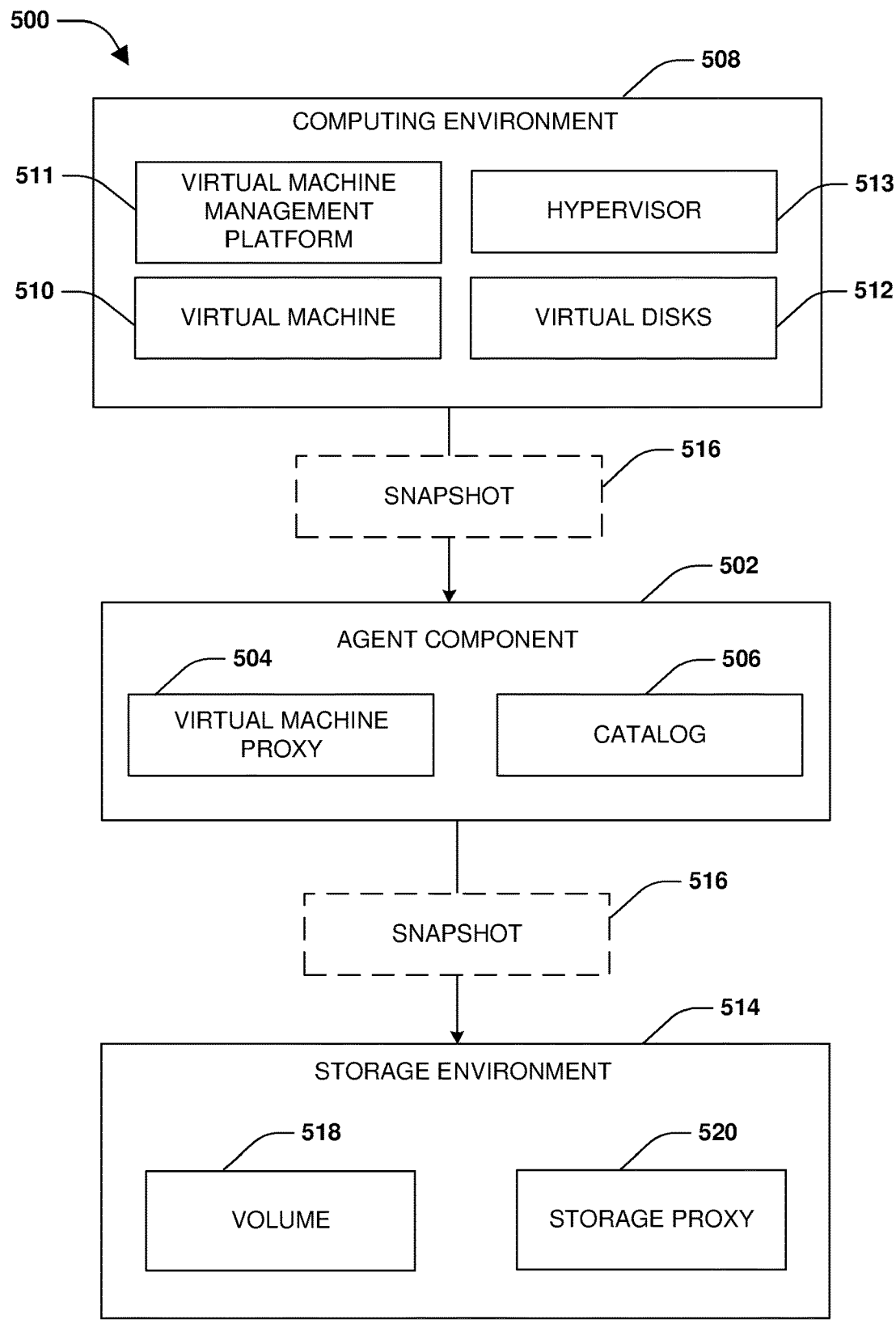
FIG. 5A is a block diagram illustrating an example system for orchestrating operations between a storage environment and a computing environment hosting virtual machines, where a backup operation is orchestrated.
Figure 5B:
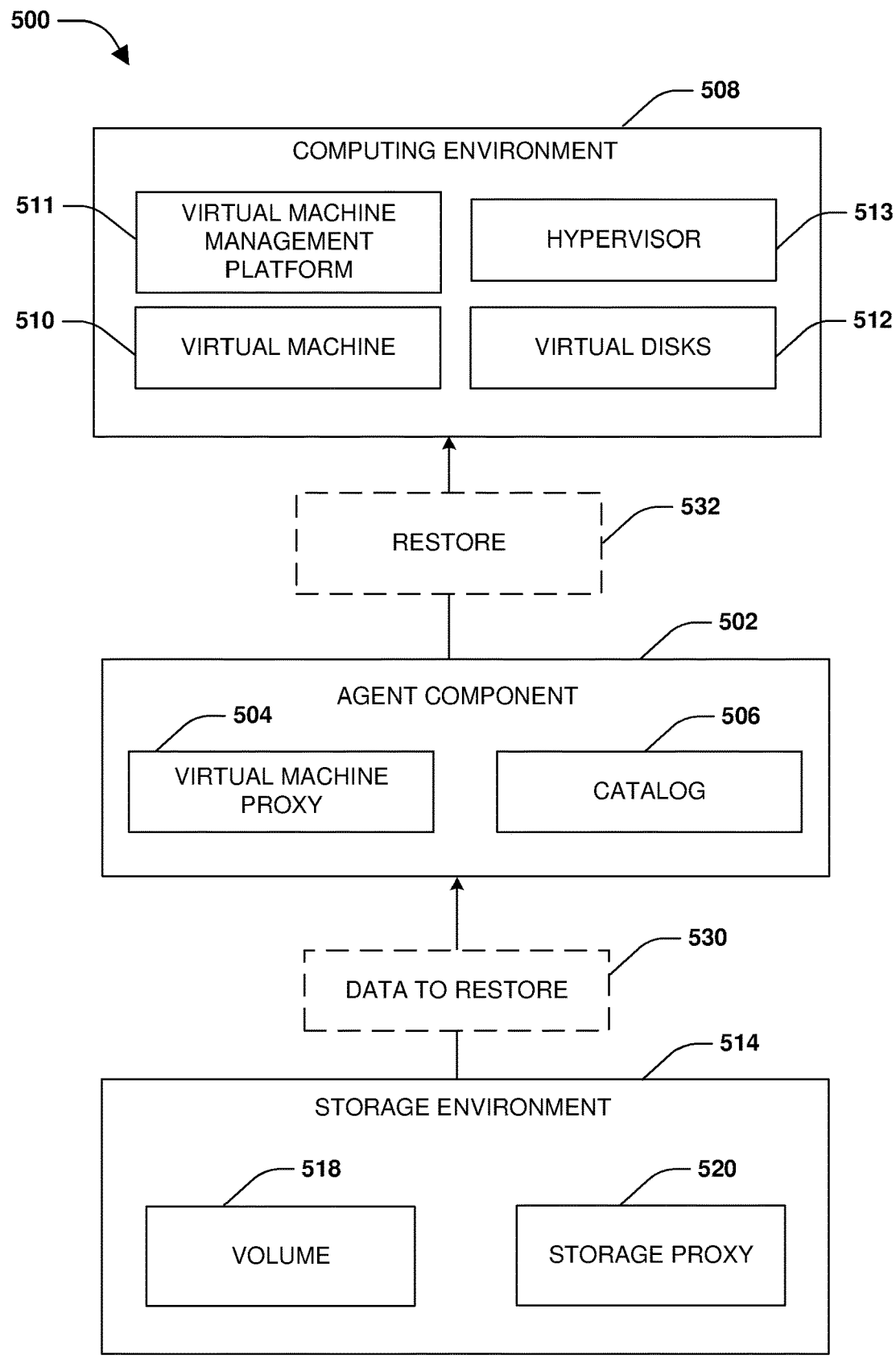
FIG. 5B is a block diagram illustrating an example system for orchestrating operations between a storage environment and a computing environment hosting virtual machines, where a restore operation is orchestrated.

One embodiment of orchestrating operations between a computing environment 508 and a storage environment 514 is illustrated by an exemplary method 400 of FIG. 4, which is further described in conjunction with system 500 of FIGS. 5A and 5B. The computing environment 508 may comprise virtualization functionality used to host virtual machines such as a virtual machine 510 that stores user data, application data, and/or operating system data of a guest operating system within virtual disks 512. For example, the computing environment 508 may comprise a hypervisor 513 that hosts virtual machines and a virtual machine management platform 511 that hosts various management operations and services for managing virtual machines such as snapshot functionality used to generate snapshots of the virtual machines. The hypervisor 513 may host the virtual machine 510 so that client devices may access a guest operating system of the virtual machine 510 for executing applications, storing and retrieving data, etc. The virtual machine management platform 511 (e.g., a virtualization suite of applications/services) may provide various services and functionality for managing the virtual machines, such as the ability to take snapshots of virtual machines, perform administrative tasks, allocate and manage resources of virtual machines, etc. The computing environment 508, such as the virtual machine management platform 511, may natively provide and support certain APIs, communication protocols, data storage formats, commands and operations, and/or other services and functionality.

A storage environment 514 may comprise a storage operating system and/or storage functionality, such as replication functionality, data mirroring functionality, data migration functionality, backup functionality, restore functionality, deduplication, compression, storage virtual machine hosting functionality, a file system that stores data within volumes, LUNs, aggregates, objects, cloud storage objects, etc. The storage environment 514 may natively support certain APIs, communication protocols, data storage formats, commands and operations, and/or other services and functionality that are different than the APIs, communication protocols, data storage formats, commands and operations, and/or other services and functionality supported by the computing environment 508. Thus, the storage environment 514 is unable to natively interact with the computing environment 508 in order to provide storage functionality and storage services for the virtual machines hosted by the computing environment 508.

Accordingly, as provided herein, an orchestrator is implemented as an agent component 502 (e.g., the orchestrator may be comprised of multiple agents, such as various services, plugins, functionality, distributed components, etc. represented as the agent component 502 in FIGS. 5A and 5B for simplicity) configured to act as an intermediary between the computing environment 508 and the storage environment 514 so that the storage environment 514 can provide robust storage services for the virtual machines of the computing environment 508 (such as virtual machine 510) notwithstanding incompatibles between the storage environment 514 and the computing environment 508.

The agent component 502 is configured to interact with the computing environment 508 and the storage environment 514 so that the storage functionality of the storage environment 514 can be provided for the computing environment 508, such as to back up the virtual machine 510 and virtual disks 512 from the computing environment 508 to the storage environment 514 and/or to restore the backed up data from the storage environment 514 to the computing environment 508 to restore the virtual machine 510. The agent component 502 interacts with a virtual machine proxy 504 configured to communicate and invoke functionality within the computing environment 508 and a storage proxy 520 configured to invoke functionality of the storage environment 514, such as storage functionality and data protection functionality. Even though the virtual machine proxy 504 is depicted as being hosted within the agent component 502, the virtual machine proxy 504 can be implement within any environment or component. Similarly, even though the storage proxy 520 is depicted as being hosted within the storage environment 514, the storage proxy 520 can be implemented within any environment or component (e.g., implemented within the agent component 502). Furthermore, the orchestrator, implemented as the agent component 502, may be hosted within and/or across various computing environments, such as a standalone computer, a cloud computing environment (e.g., hosted as a virtual machine), or other environment.

The virtual machine proxy 504 is configured to be compatible with the APIs, communication protocols, data storage formats, commands and operations, and/or other services and functionality implemented by the computing environment 508, such as services and functionality provided by the hypervisor 513 and the virtual machine management platform 511 of the computing environment 508. Thus, the virtual machine proxy 504 can reformat, modify (e.g., replace, remove, and/or add certain commands, operations, variables, text, parameters, functions, or other portions of a command), or replace commands (e.g., commands expected from the agent component 502 may be mapped to corresponding commands understood by the hypervisor 513 and the virtual machine management platform 511, and thus a command from the agent component 502 may be replaced with a corresponding command mapped to the command) from the agent component 502 into commands understood by and compatible with the computing environment 508.

The storage proxy 520 is configured to be compatible with the APIs, communication protocols, data storage formats, commands and operations, and/or other services and functionality implemented by the storage environment 514, such as services and functionality provided by snapshot management functionality, data migration functionality, and data backup and restore functionality of the storage environment 514. Thus, the storage proxy 520 can reformat, modify (e.g., replace, remove, and/or add certain commands, operations, variables, text, parameters, functions, or other portions of a command), or replace commands (e.g., commands expected from the agent component 502 may be mapped to corresponding commands understood by the services and functionality of the storage environment, 508 and thus a command from the agent component 502 may be replaced with a corresponding command mapped to the command) from the agent component 502 into commands understood by and compatible with the storage environment 514.

The agent component 502 is configured to transmit commands to the virtual machine proxy 504. Because these commands may not be natively supported by the virtual machine management platform 511 and the hypervisor 513, the virtual machine proxy 504 may reformat, translate, exchange (e.g., replace a command with another command mapped to the command and formatted for the computing environment 508) and/or modify the commands to a format understood by the computing environment 508. The agent component 502 is configured to transmit commands to the storage proxy 520. In an embodiment, the storage proxy 520 may reformat, translate, exchange (e.g., replace a command with another command mapped to the command and formatted for the storage environment 514) and/or modify the commands to a format understood by the storage environment 514.

At 402, the virtual machine proxy 504 is accessed by the agent component 502 to identify the virtual machine 510 hosted by the computing environment 508 and/or properties of the virtual machine 510 (e.g., information and metadata relating to identifiers and locations of the virtual disks 512 of the virtual machine 510, information identifying prior snapshots created from the virtual disks 512, identification information of the virtual machine 510, etc.). The virtual machine proxy 504 may communicate with the computing environment 508 using representation state transfer (REST) communication. In an example, credentials for the virtual machine management platform 511 of the computing environment 508 hosting the virtual machine 510 are transmitted by the agent component 502 to the virtual machine proxy 504 for accessing the virtual machine 510 through the computing environment 508. The credentials may be input into the agent component 502 by an administrator through a user interface or the agent component 502 may be capable of accessing such credentials from the virtual machine management platform 511 based upon some permission granted to the agent component 502 for accessing such credentials. In another example, the credentials may be received from the virtual machine proxy 504 by the agent component 502.

At 404, the storage proxy 520 is accessed by the agent component 502 in order to communicate with the storage functionality of the storage environment 514 for performing a backup procedure and/or other storage procedures such as a restore procedure based upon the properties of the virtual machine 510. For example, the agent component 502 transmits an initiate backup request to the storage proxy 520 (e.g., the backup request may be generated in response to an indication that the backup is to be performed, such as an indication from a backup service hosted by the storage environment 514). Because the initiate backup request may not be formatted to be natively understood by a backup service of the storage environment 514, the storage proxy 520 may format, modify, and/or replace the initiate backup request with an equivalent command that can be understood by the backup service of the storage environment 514. In this way, the reformatted command, modified command, or equivalent command may be transmitted from the storage proxy 520 to the storage service of the storage environment 514. In an example, the agent component 502 and/or the storage proxy 520 communicates with the storage environment 514 utilizing representation state transfer (REST) communication.

At 406, the agent component 502 utilizes the virtual machine proxy 504 to invoke the computing environment 508 to create a snapshot 516 of the virtual disks 512 of the virtual machine 510. For example, the agent component 502 transmits a snapshot create request to the virtual machine proxy 504. In an example, the snapshot create request may have originated from the storage environment 514. Because the snapshot create request may not be formatted to be natively understood by the virtual machine management platform 511, the virtual machine proxy 504 may format, modify, and/or replace the snapshot create request with an equivalent command that can be understood by the virtual machine management platform 511. In this way, the reformatted command, modified command, or equivalent command may be transmitted from the virtual machine proxy 504 to the virtual machine management platform 511. In response to creating a snapshot 516 of the virtual disks 512, the virtual machine management platform 511 of the computing environment transmits the snapshot 516 to the agent component 502. In an example, the virtual machine 510 may be shut down before the snapshot 516 is captured.

At 408, the agent component 502 utilizes the storage proxy 520 to back up the snapshot 516 to the volume 518 within the storage environment 514 using the backup procedure of the backup service. The storage proxy 520 may package the snapshot 516 into a format understood by the backup service of the storage environment 514 performing the backup procedure. In this way, the backup procedure may be performed to obtain the snapshot 516 of the virtual disks 512 of the virtual machine 510 and store data of the snapshot 516 within the volume 518 of the storage environment 514. In an example, the backup procedure may be part of a backup job for the virtual machine 510 that is created and monitored by the agent component 502, such as where the agent component tracks a state of the backup job. An instance of the snapshot 516 at the computing environment 508 may be deleted upon the backup procedure completing.

In an example, the agent component 502 may generate a catalog 506 that identifies files within snapshots, of the virtual machine 510, stored within the volume 518 of the storage environment 514. The catalog 506 can be searched for one or more files within a snapshot to restore to the virtual machine 510. In this way, a fine granularity of restore may be performed for the virtual machine 510.

In an example, the agent component 502 may utilize the virtual machine proxy 504 to invoke the computing environment 508 to perform various actions. For example, the agent component 502 may transmit a request to the virtual machine proxy 504 to create a new virtual machine within the computing environment 508. The agent component 502 may utilize the storage proxy 520 to obtain snapshot data, which can be provided to the virtual machine proxy 504 for creating the new virtual machine. In this way, the agent component 502 functions as an orchestrator for orchestrating operations between the computing environment 508 and the storage environment 512 using the virtual machine proxy 504 and the storage proxy 520, such as creating virtual machines, restoring virtual machines, backing up virtual machines, deleting virtual machines, etc.

FIG. 5B illustrates the agent component 502 interacting with the storage proxy 520 and the virtual machine proxy 504 to implement a restore procedure, such as a restore 532 of data for the virtual machine 510 (e.g., a full restore using a single snapshot of the virtual machine 510 backed up to the volume 518 or an incremental restore using a data difference between two snapshots of the virtual machine 510 backed up to the volume 518). For example, the agent component 502 utilizes the storage proxy 520 to initiate the restore procedure to perform the restore 532 of the virtual machine 510. As part of the restore, data 530 representing a state of the virtual machine 510 to which the virtual machine 510 is to be restored is identified in the storage environment 530. In an embodiment, storage functionality of the storage environment 514 may evaluate the snapshot 516 and/or other snapshots stored within the volume 518 to identify the data 530 that is then transmitted to the agent component 502 by the storage proxy 520. In embodiment, the agent component 502 may host the storage proxy 520, and thus the data 530 is identified as being stored within the storage environment 514.

The agent component 502 utilizes the virtual machine proxy 504 to transfer the data 530 to the computing environment 508 to apply to the virtual disks 512 of the virtual machine 510 as part of restoring 532 the virtual machine 510. In this way, the virtual disks 512 are modified based upon the data 530 by so that a state of the virtual machine 510 corresponds to a state of the virtual machine 510 captured by the snapshot 516 or a data difference between the snapshot 516 and a different snapshot for an incremental restore. In an example, the restore 532 is performed at a virtual machine granularity. In another example, the restore 532 is performed as a block level restore of data blocks within the virtual disks 512. The restore 532 may be an incremental restore using the data 530 that corresponds to a difference between a common snapshot of the virtual machine 510 (a snapshot common to both the storage environment 514 and the computing environment 508) and another snapshot of the virtual machine 510 (e.g., snapshot 516).

Figure 6:
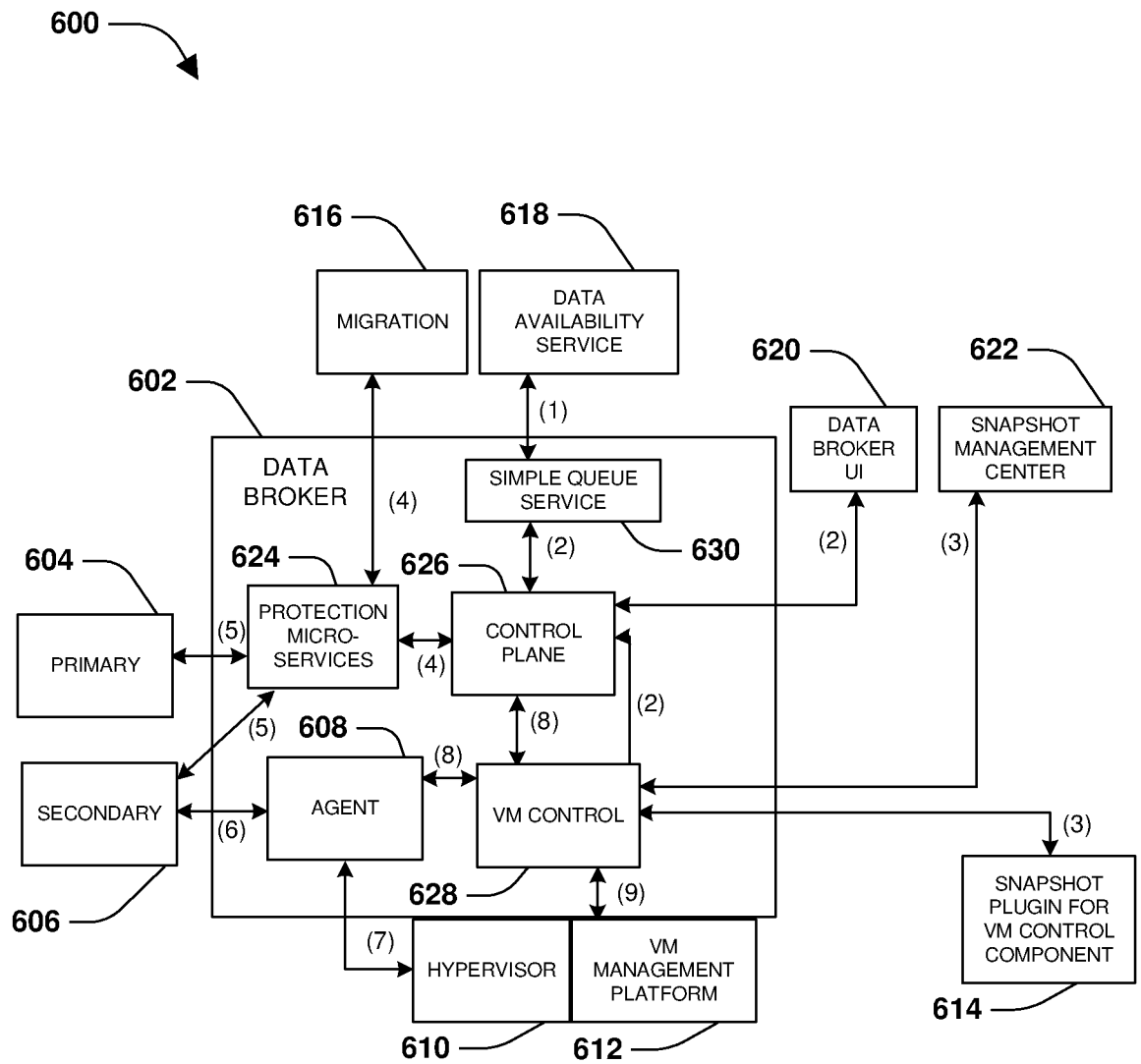
FIG. 6 is a block diagram illustrating an example system for orchestrating operations between a storage environment and a computing environment hosting virtual machines.

FIG. 6 illustrates an example of a system 600 for orchestrating operations between a computing environment, comprising a virtual machine management platform 612 and a hypervisor 610 configured to host and manage virtual machines, and a storage environment configured to provide storage functionality and services such as the storage of data through a primary system 604 and/or a secondary system 606. The orchestrator may be implemented as an agent component comprising various services, functionality, and/or components of the system 600. In an embodiment, the orchestrator may be implemented in association with a data availability service 618 (e.g., a cloud-based service that manages data protection workflows between the primary system 604 and the secondary system 606 such as the migration, backup, and/or restoration of data between on-premise storage, cloud storage, and/or storage of other storage providers).

The orchestrator may be implemented as logic and/or functionality across one or more components depicted in FIG. 6. In an embodiment, the orchestrator may be implemented in association with a migration service 616 configured to migrate data between various storage locations, device, and/or storage providers. In an embodiment, the orchestrator may be implemented in association with a snapshot management center 622 configured to provide centralized control and oversight for managing application specific backup operations, restore operations, clone jobs, snapshot creation and management operations, etc. In an embodiment, the orchestrator may be implemented in association with a snapshot plugin 614 used to interact with the virtual machine management platform 612, such as through a virtual machine proxy and the virtual machine control component 628, for performing various commands such as taking snapshots of virtual machines hosted by the hypervisor 610 of the computing environment. The virtual machine proxy, used to communicate with the hypervisor 610 and the virtual machine management platform 612, may be implemented by the snapshot plugin 614, the virtual machine control component 628, the agent 608, or other component or across multiple components.

In an embodiment, the orchestrator may be implemented in association with a data broker user interface (e.g., a user interface of the data broker 602) that allows a client device to invoke functionality provided by a data broker 602 for managing data of a client stored across the primary system 604, the secondary system 606 (e.g., cloud storage), virtual machines, and/or other various storage locations and/or providers. For example, the client device may display the data broker user interface 620 through a display of the client device (e.g., execution of a storage administration application, a web-based portal accessible through a website, etc.), which allows a user to view volumes within the primary system 604, initiate backups and restores of data within the secondary system 606, identify and/or access virtual machines, schedule backups, initiate an incremental backup and/or restore, view snapshots of virtual machines, and/or perform a wide variety of functionality related to managing data.

An agent 608 within the data broker 602 may be configured to connect to data storage provided by the hypervisor 610 to the virtual machines, such as to identify and access virtual disks used by the virtual machines to store data. The agent 608 may connect to the data storage through a connection type (7) (e.g., a transport layer security (TLS) (e.g., a TSLv1.2) connection to an ESX host using a Vsphere username and password) to the hypervisor 610 utilizing credentials, such as a user name and password, used to log into the hypervisor 610. Also, the agent 608 may connect to the storage environment, such as to the secondary system 606, through a connection type (6) (e.g., utilizing a logical replication storage efficiency (LRSE) engine over an unencrypted socket). The agent 608 may be configured within a data plane configured to transfer data, such as snapshot data and/or virtual machine data, between the storage environment and the computing environment (and/or vice versa) in order to facilitate various operations such as backup and restore. The orchestrator may utilize a storage proxy to interact with the storage environment. The storage proxy may be hosted by the agent 608, by the primary system 604, by the secondary system 606, by the data broker 602, or by other components (e.g., components of the orchestrator) or across multiple components.

A control backend of the data broker 602 may comprise a control plane 626 through which the data broker user interface 620, the virtual machine control component 628, the data availability service 618 using a simple queue service 630, and protection micro-services 624 can communicate over various types of connections. In an embodiment, the protection micro-services 624 are connected to the control plane 626 through a connection type (4) (e.g., using representation state transfer (REST) communication and/or credentials, such as a username and password). The protection micro-services 624 may comprise various micro-services that provide data protection and storage efficiency, such as backup functionality, restore functionality, incremental backup and restore functionality, deduplication, snapshot creation and management, data migration, compression, encryption, etc. In an example, the protection micro-services 624 may utilize a connection type (5) to interact with the primary system 604 and/or the secondary system 606 in order to provide data protection and storage services for the primary system 604 and/or the secondary system 606. The connection type (5) may correspond to ZAPI commands using credentials such as username and password maintained by storage operating systems of the primary system 604 and/or the secondary system 606. In another example, the protection micro-services 624 may work together with the migration service 616 to provide data migration for data stored by the primary system 604 and/or the secondary system 606. The protection micro-services 624 may communicate with the migration service 616 over the connection type (4) such as using representation state transfer (REST) communication and/or credentials, such as a username and password.

The data availability service 618 may be connected to the simple queue service 630 through a connection type (1) such as by using simple queue service (SQS) over HTTP. The simple queue service 630 may be connected to the control plane 626 through a connection type (2) using representation state transfer (REST) communication and/or credentials, such as a username and password. The simple queue service 630 may be a managed message queuing service that enables the decoupling and scale of micro-services, distributed systems, and serverless applications, and provides the ability to send, store, and receives messages between software components at any volume without losing messages or requiring other services to be available. The virtual machine control component 628 may be connected to the control plane 626 using a connection type (8) such as Thrift over HTTPS on a local system of the data broker 602. The virtual machine control component 628 may also be connected to the control plane 626 using the connection type (2) such as by using representation state transfer (REST) communication and/or credentials, such as a username and password.

The orchestrator may utilize the snapshot plugin 614 to transmit commands over a connection type (3) to the virtual machine control component 628. The virtual machine control component 628 may communicate with the virtual machine management platform 612 of the computing environment, such as to issue commands to the virtual machine management platform 612 to create snapshots of virtual machines hosted by the hypervisor 610. The virtual machine control component 628 may communicate with the virtual machine management platform 612 over a connection type (9), such as using APIs, provided by the virtual machine management platform 612 over HTTPS using credentials such as username and password maintained by the virtual machine management platform 612.

The snapshot management center 622 may be connected to the virtual machine control component 628 over the connection type (3). In this way, the snapshot management center 622 can issue snapshot related commands through the virtual machine control component 628 and/or the virtual machine plugin 614 for execution by the virtual machine management platform 612. If commands received by the virtual machine control component 628 are not formatted to be understood by the virtual machine management platform 612, then those commands may be reformatted, replaced with equivalent commands mapped to those commands, and/or otherwise modified into commands understood by the virtual machine management platform 612.

The orchestrator is implemented in association with and/or comprised of the migration service 616, the data availability service 618, the data broker user interface 620, the snapshot management center 622, and/or the snapshot plugin 614 for the virtual machine control component 628. The orchestrator is configured to perform agent registration to register with the agent 608 for access to the storage environment such as to access the secondary system 606 and for access to the computing environment such as to access the hypervisor 610 and/or the virtual management platform 612 for identifying, accessing, creating, modifying, and/or deleting virtual machines, virtual disks of the virtual machines, snapshots of the virtual machines, metadata describing snapshots, etc. The orchestrator is configured to perform virtual machine discovery to identify virtual machines hosted by the hypervisor 610, such as through the agent 608 over the connection type (7).

The orchestrator is configured to perform virtual machine backup and restore orchestration from one environment to another environment, such as from cloud to the secondary system 606. The orchestrator may utilize the snapshot management center 622, the snapshot plugin 614, the migration service 616, and/or the data availability service 618 to perform the virtual machine backup and restore orchestration. Furthermore, the orchestrator may utilize various components of the data broker 602, such as the control plane 626, the protection micro-services 624, the agent 608, the virtual machine control component 628, and/or other components for performing the virtual machine backup and restore orchestration. The orchestrator is configured to maintain a catalog of the virtual machines.

The data broker 602 is configured to discover the virtual machines hosted by the hypervisor 610, such as through the agent 608 over the connection type (7). The data broker 602 is configured to discover volumes hosted by the storage environment, such as volumes hosted by the primary system 604 and/or the secondary system 606, such as through the agent 608. The data broker 602 is configured to implement a granular data mover to move data (e.g., data of a snapshot, a data difference between two snapshots, etc.) between the storage environment such as the primary system 604 and/or the secondary system 606 and the computing environment such as storage within which virtual disks of the virtual machines are stored. The data broker 602 is configured to implement a local virtual machine consistent snapshot creation and retention, such as to retain snapshots within the primary system 604 and/or the secondary system 606, which may be local to the data broker 602.

The data broker 602 is configured to restore data of one or more snapshots from the storage environment to a virtual machine hosted within the computing environment. In an embodiment, the virtual machine proxy used to interact with the hypervisor 610, the virtual machine management platform 612, storage of the computing environment, virtual machines hosted by the hypervisor 610, and/or virtual disks of the virtual machines may be implemented within the agent 608 and/or other components of the data broker 602.

In an embodiment, the storage proxy may be implemented within a storage operating system associated with the storage environment such as the primary system 604 and/or the secondary system 606 (e.g., the storage proxy may be implemented within the secondary system 606). The agent 608 may communicate with the storage operating system and/or the storage proxy utilizing the connection type (6) such as through a logical replication storage efficiency (LRSE) engine over an un-encrypted socket. The orchestrator may communicate with the data broker 602 and/or the storage operating system using the storage proxy through representation state transfer (REST) communication APIs.

The storage operating system such as the secondary system 606 of the storage environment is configured to discovery resources of the storage environment, such as storage resources, volumes, etc. The storage operating system is configured to schedule snapshot data transfers, such as through the snapshot management center 622 and/or the protection micro-services 624 (e.g., transfer snapshot data between the primary system 604, the secondary system 606, and/or storage within the computing environment used to store virtual disks of virtual machines). The storage operating system is configured to create snapshots and retain the snapshots, such as by creating and retaining snapshots within the secondary system 606. In an example, the storage operating system is configured to create and/or retain snapshots within cloud storage. The storage operating system is configured to restore a snapshot from the cloud storage to the secondary system 606 and/or the primary storage system 604.

In an embodiment, the virtual machine proxy provides a simple queue service API gateway between the orchestrator and the data broker 602, such as where the simple queue service 630 is provided between the control plane 626 of the data broker 602 and the data availability service 618 of the orchestrator. The control plane 626 provides representation state transfer (REST) communication APIs (as an example) through which interactions to the data broker 602 occur. A proxy (e.g., a storage proxy and/or the virtual machine proxy) will call the representation state transfer (REST) communication APIs of the control plane 626 using an administrator username and password, and the control plane 626 will issue a token to the proxy so that the proxy can use the token to communicate with the control plane 626. In this way, the proxy can communicate with workflow engines hosted by the control plane 626 to perform back up and restore operations between the storage environment and the computing environment hosting the virtual machines.

The virtual machine control component 628 hosts representation state transfer (REST) communication (as an example) APIs used to interact with APIs of the virtual machine management platform 612 (e.g., vsphere APIs of a suite of server virtualization products and services) for performing backup, restore, and/or clone operations (e.g., backing up a virtual machine hosted by the hypervisor 610 and managed by the virtual machine management platform 612). The virtual machine control component 628 hosts virtual storage APIs for data protection (VADP) representation state transfer (REST) communication APIs. These APIs are exposed to the snapshot plugin 614.

The protection micro-services 624 hosts a job scheduler configured to schedule and monitor jobs, such as backup jobs, restore jobs, data migration jobs, clone jobs, etc. The protection micro-services 624 provide a storage DP control, which is a micro-service that provides representation state transfer (REST) communication API based access to storage, such as storage of the primary system 604, storage of the secondary system 606, etc. The storage DP control exposes coarse grain APIs for backup, restore, and clone workflows to implement at the storage environment. The protection micro-services 624 provides a database access layer that stores backup metadata for workflows of the snapshot management center 622. The protection microservices 624 provides logging and alert notifications, such as through the data broker user interface 620, email, or other notification interfaces.

The data broker 602 comprises a data mover. The data mover provides a data path to transfer virtual machine disk backup data between the computing environment (e.g., virtual machine disk backup data from snapshots created by the virtual machine management platform 612 of virtual machines hosted by the hypervisor 610) and the storage environment such as snapshot backup data stored within volumes the primary system 604 and/or the secondary system 606. In this way, the orchestrator can orchestrate operations between the computing environment and the storage environment by leveraging the data broker 602, such as the data mover to move data between the computing environment and the storage environment. Thus, storage functionality of the storage environment can be provided for virtual machines hosted by the computing environment.

According to an aspect of the present disclosure, an apparatus/machine/system for performing a backup and/or restore comprises a means for accessing a virtual machine proxy associated with a computing environment hosting a virtual machine to identify the virtual machine and properties of the virtual machine; a means for accessing a storage proxy associated with a storage environment comprising a volume within which snapshots of the virtual machine are to be stored to initialize a backup procedure based upon the properties of the virtual machine; a means for utilizing the virtual machine proxy to create a snapshot of the virtual machine; and a means for utilizing the storage proxy to back up the snapshot to the volume using the backup procedure.

Figure 7:
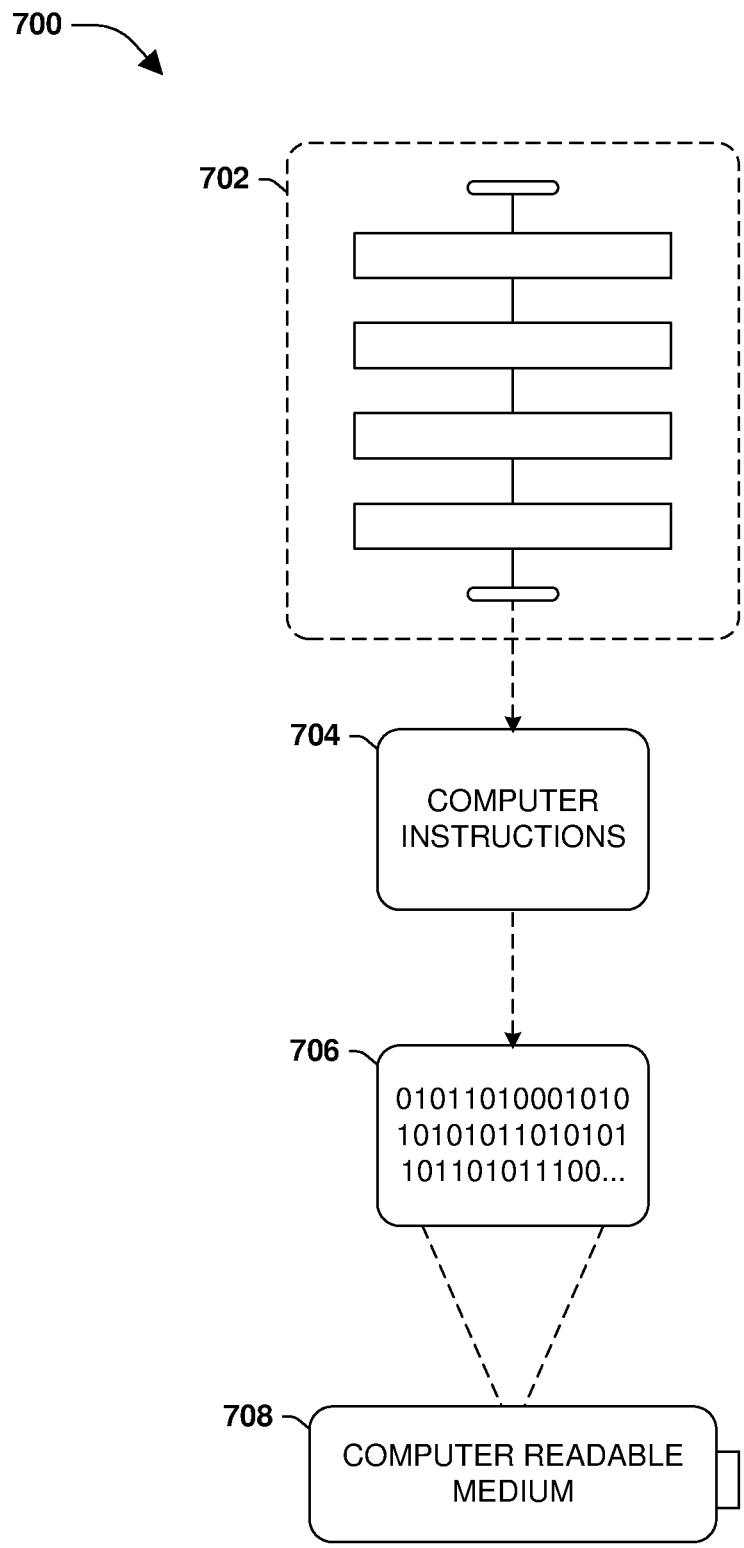
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 400 of FIG. 4, for example. In some embodiments, the processor-executable computer instructions 704 are configured to implement a system, such as at least some of the exemplary system 500 of FIGS. 5A-5B and/or at least some of the exemplary system 600 of FIG. 6, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

in response to a backup command, creating a snapshot of a virtual machine hosted within a computing environment by a virtual machine management platform that supports a first format different from a second format supported by a storage service of a storage environment where the snapshot is to be stored;

reformatting the backup command into the first format compatible with the virtual machine management platform and provide a reformatted backup command to the virtual machine management platform, wherein the reformatted backup command comprises instructions used by the virtual machine management platform to create the snapshot; and in response to determining that the virtual machine management platform created the snapshot, reformatting a storage command into the second format compatible with the storage service and provide a reformatted storage command to the storage service to back up the snapshot within the storage environment.

2. The method of claim 1, comprising:

in response to a command for modifying the virtual machine based upon a difference between the snapshot and an incremental snapshot of the virtual machine, reformatting the command into the second format and provide a first reformatted command to the storage service to identify and transfer a data difference between the snapshot and the incremental snapshot to the computing environment for modifying the virtual machine using the data difference.

3. The method of claim 2, comprising:
reformatting the command into the first format compatible and provide a second reformatted command to the virtual machine management platform for modifying the virtual machine using the data difference received from the storage environment.

4. The method of claim 1, comprising:
in response to a command to create a new virtual machine within the computing environment, reformatting the command into the second format and provide a first reformatted command to the storage service to transfer data of the snapshot within the storage environment to the computing environment for creating the new virtual machine.

5. The method of claim 4, comprising:
reformatting the command into the first format provide a second reformatted command to the virtual machine management platform to create the new virtual machine using the data of the snapshot received from the storage environment.

6. The method of claim 1, wherein the reformatting the backup command further comprises:
replacing the backup command with the reformatted backup command based upon the reformatted backup command being mapped to the backup command.

7. The method of claim 1, wherein the reformatting the storage command further comprises:
modifying the storage command from a format not natively supported by the storage service into the reformatted storage command according to the second format supported by storage service.

8. A non-transitory machine readable medium comprising instructions for performing a method, which when executed by a machine, causes the machine to:
in response to a backup command, create a snapshot of a virtual machine hosted within a computing environment by a virtual machine management platform that supports a first format different from a second format supported by a storage service of a storage environment where the snapshot is to be stored;
reformat the backup command into the first format compatible with the virtual machine management platform and provide a reformatted backup command to the virtual machine management platform, wherein the reformatted backup command comprises instructions used by the virtual machine management platform to create the snapshot; and
in response to determining that the virtual machine management platform created the snapshot, reformat a storage command into the second format compatible with the storage service and provide a reformatted storage command to the storage service to back up the snapshot within the storage environment.

9. The non-transitory machine readable medium of claim 8, wherein the instructions cause the machine to:
reformat the backup command by adding credentials to the backup command to create the reformatted backup command that includes the credentials for accessing the virtual machine through the virtual machine management platform.

10. The non-transitory machine readable medium of claim 8, wherein the instructions cause the machine to:
in response to a restore command, reformat the restore command into the second format and provide a first reformatted restore command to the storage service to transfer data of the snapshot within the storage environment to the computing environment for restoring the virtual machine to a state captured by the snapshot.

11. The non-transitory machine readable medium of claim 10, wherein the instructions cause the machine to:
reformat the restore command into the first format and provide a second reformatted restore command to the virtual machine management platform for utilizing the transferred data of the snapshot received from the storage environment to restore the virtual machine.

12. The non-transitory machine readable medium of claim 8, wherein the instructions cause the machine to:
in response to a command for modifying the virtual machine based upon a difference between the snapshot and an incremental snapshot of the virtual machine, reformat the command into the second format and provide a first reformatted command to the storage service to identify and transfer a data difference between the snapshot and the incremental snapshot to the computing environment for modifying the virtual machine using the data difference.

13. The non-transitory machine readable medium of claim 12, wherein the instructions cause the machine to:
reformat the command into the first format and provide a second reformatted command to the virtual machine management platform for modifying the virtual machine using the data difference received from the storage environment.

14. The non-transitory machine readable medium of claim 8, wherein the instructions cause the machine to:
translating the backup command from a format not natively supported by the virtual machine management platform into the reformatted backup command according to the first format supported by the virtual machine management platform.

15. The non-transitory machine readable medium of claim 8, wherein the instructions cause the machine to:
translating the storage command from a format not natively supported by the storage service into the reformatted storage command according to the second format supported by storage service.

16. A computing device comprising:
a memory comprising machine executable code for performing a method; and
a processor coupled to the memory, the processor configured to execute the machine executable code to cause the processor to:
in response to a backup command, create a snapshot of a virtual machine hosted within a computing environment by a virtual machine management platform that supports a first format different from a second format supported by a storage service of a storage environment where the snapshot is to be stored;
reformat the backup command into the first format compatible with the virtual machine management platform and provide a reformatted backup command to the virtual machine management platform, wherein the reformatted backup command comprises instructions used by the virtual machine management platform to create the snapshot; and
in response to determining that the virtual machine management platform created the snapshot, reformat a storage command into the second format compatible with the storage service and provide a reformatted storage command to the storage service to back up the snapshot within the storage environment.

17. The computing device of claim 16, wherein the machine executable code causes the processor to:
  replacing the storage command with the reformatted storage command based upon the reformatted storage command being mapped to the storage command.

18. The computing device of claim 16, wherein the machine executable code causes the processor to:
  modifying the backup command from a format not natively supported by the virtual machine management platform into the reformatted backup command according to the first format supported by the virtual machine management platform.

19. The computing device of claim 16, wherein the machine executable code causes the processor to:
  reformat the backup command by adding credentials to the backup command to create the reformatted backup command that includes the credentials for accessing the virtual machine through the virtual machine management platform.

20. The computing device of claim 19, wherein the machine executable code causes the processor to:
  in response to a restore command, reformat the restore command into the second format and provide a first reformatted restore command to the storage service to transfer data of the snapshot within the storage environment to the computing environment for restoring the virtual machine to a state captured by the snapshot.

* * * * *